Patented Oct. 15, 1935

2,017,788

UNITED STATES PATENT OFFICE 2,017,788

STEEL WELDING METHOD

Clarence Leon Delachaux, Gennevilliers, France, assignor to Acieries de Gennevilliers, Anciens Etablissements Delachaux, Gennevilliers, France, a corporation of France No Drawing. Application May 17, 1933, Serial No. 671,592. In France July 27, 1929

9 Claims. (Cl. 148—3)

The present specification is a continuation in part of my prior application Ser. No. 460,100 filed on June 9, 1930 and is merely a development of the examples given on pages 10 to 13 of the original specification filed on June 9, 1930. Applicant is manufacturing a self-hardening moulded alloy steel according to specification Ser. No. 620,933 filed by Marthourey as a continuation in part on July 5, 1932. The present application covers a method for assembling through welding two parts made either both of this steel or of this steel and of an ordinary rolled steel for instance.

More or less self-hardening steels are known, which are specially adapted for use in the moulded state and which contain 0.2 to 0.5% of carbon, 0.6 to 2% of chromium, 2 to 5% of nickel, 0.1 to 1.5% of molybdenum plus tungsten including molybdenum in a proportion with reference to the steel of 0.1 to 1%, 0.2 to 1% of manganese, 0.1 to 0.5% of silicon and eventually one at least of the following elements: vanadium, or titanium up to 0.05% aluminium up to 0.1%, copper up to 5%, phosphorus and sulphur being in very small amounts the proportion of phosphorus and sulphur being for instance under 0.035% and 0.015%, respectively.

A steel of this type has been described in Marthourey's copending application 620,933 filed on July 5, 1932. After heat-treatment, it shows in the moulded state, in particular for rails and railroad parts, properties similar to those of the best forged or rolled steels used to this day.

When it is desired to weld two parts of which one at least is of the steel defined hereinabove, it is necessary to cast between the two ends to be welded a welding mass which is then heat treated.

But it is obvious this mass cannot be cast with the same precautions as the parts to be welded and cannot be heat treated in the same accurate manner, as the parts which are generally rails laid on the track cannot be moved. Moreover this welding mass is generally made outside the place of welding through an aluminothermic process at 2000° C., which provides moreover the drawback that the mass contains necessarily more P, S, Si, Mn and Al than the parts to be welded. In particular by reason of these particular conditions the molybdenum is often badly alloyed or badly distributed. Lastly if it contains a substantial amount of copper, flaws are liable to occur.

If there is used for the welding mass, a composition as near as possible that of the parts to be welded, the welding zone would have too great a brittleness, as its too considerable hardness in combination with the presence of a crystalline structure which it is difficult to improve thermically, may produce scaling and flaws.

My invention consists thus chiefly in the use as a welding mass of a steel having contents in C, Cr, Ni, Mo lower than those in the parts to be welded. These elements are those which produce self-hardening. There will therefore be formed in the welding zone, a steel slightly less hard than for the part or parts to be welded which are of alloy steel, this precaution being necessary for preventing brittleness.

In the case where the parts to be welded contain comparatively high contents of copper, the contents of copper of the welding mass will be similarly limited so as to prevent flaws.

By way of example, for welding two parts of which one at least is formed by a steel containing:

| | |
|---|---|
| C | 0,25 to 0,45% |
| Cr | 0,8 to 1,5% |
| Ni | 2 to 4% |
| Mo+W | 0,1 to 1,5% including a proportion of molybdenum between 0,1 and 1%. |
| Mn | 0,2 to 0,8% |
| Si | 0,1 to 0,5% |
| Va | 0 to 0,5% |
| Ti | 0 to 0,5% |
| Ti | 0 to 0,5% |
| Al | 0 to 0,12% |
| Cu | 0 to 5% |
| P | 0,025% |
| S | 0,010% |

The welding masses used will contain:

| | |
|---|---|
| C | 0,2 to 0,4% |
| Cr | 0,3 to 1,2% |
| Ni | 1,5 to 3,5% |
| Mo+W | 0 to 1,5% |
| Mn | 0,3 to 1% |
| Si | 1% |
| Va | 0 to 0,5% |
| Ti | 0 to 0,5% |
| Al | 0 to 1% |
| Cu | 0 to 3% |
| P | 0,075% |
| S | 0,050% |

The heat treatment of the welding zone, i. e. the zone comprising together the welding mass and the adjacent ends of the parts to be welded may consist firstly in removing the mould which has served for casting the welding mass in the joint and wherein it has become solid, when the temperature of the mass has reached a predetermined value between 1000° C. and 0° C. In fact the self hardening of this mass varies with the temperature at which it is exposed to air.

The heat treatment may comprise then after one or more reheatings at a temperature above transformation point (say between 900 and 1000°) and eventually one or more annealings through heating at a temperature underneath transformation point (say underneath 750° C).

What I claim is:

1. A method for welding steel parts containing 0.2 to 0.5% carbon, 0.6 to 2% chromium, 2 to 5% nickel, 0.1 to 1.5% molybdenum plus tungsten including 0.1 to 1% molybdenum, 0.2 to 1% manganese, 0.1 to 0.5% silicon, elements from a group comprising the following additions: from trace up to 0.5% vanadium, from trace up to 0.5% titanium, less than 0.035 and 0.015% of phosphorus and sulphur respectively and the balance iron, consisting in placing the ends of the parts to be welded in a mold, pouring into said mold a welding material of a self-hardening steel with 0.2 to 0.4% carbon 0.3 to 1.2% chromium, 1.5 to 3.5% nickel, from trace up to 1.5% molybdenum plus tungsten, 0.3 to 1% manganese, less than 1% silicon, elements from a group comprising the following additions: from trace up to 0.5% vanadium, from trace up to 0.5% titanium, less than 0.075% and 0.050% of phosphorus and sulphur respectively, and the balance iron, said welding material being characterized by having contents of carbon, chromium molybdenum and nickel lower than in the parts to be welded and stripping the mold between 1000° C. and 0° C.

2. A method for welding steel parts containing 0.2 to 0.5% carbon, 0.6 to 2% chromium, 2 to 5% nickel, 0.1 to 1.5% molybdenum plus tungsten including 0.1 to 1% molybdenum, 0.2 to 1% manganese, 0.1 to 0.5% silicon, elements from a group comprising the following additions: from trace up to 0.5% vanadium, from trace up to 0.5% titanium, less than 0.035 and 0.015% of phosphorus and sulphur respectively and the balance iron, consisting in placing the ends of the parts to be welded in a mold, pouring into said mold a welding material of a self-hardening steel with 0.2 to 0.4% carbon, 0.3 to 1.2% chromium, 1.5 to 3.5% nickel, from trace up to 1.5% molybdenum plus tungsten, 0.3 to 1% manganese, less than 1% silicon, elements from a group comprising the following additions: from trace up to 0.5% vanadium, from trace up to 0.5% titanium, less than 0.075% and 0.050% of phosphorus and sulphur respectively, and the balance iron, said welding material being characterized by having contents of carbon, chromium, molybdenum and nickel lower than in the parts to be welded, stripping the mold between 1000° C. and 0° C., cooling, and reheating at least once above transformation point.

3. A method for welding steel parts containing 0.2 to 0.5% carbon, 0.6 to 2% chromium, 2 to 5% nickel, 0.1 to 1.5% molybdenum plus tungsten including 0.1 to 1% molybdenum, 0.2 to 1% manganese, 0.1 to 0.5% silicon, elements from a group comprising the following additions: from trace up to 0.5% vanadium, from trace up to 0.5% titanium, less than 0.035 and 0.015% of phosphorus and sulphur respectively and the balance iron, consisting in placing the ends of the parts to be welded in a mold, pouring into said mold a welding material of a self-hardening steel with 0.2 to 0.4% carbon, 0.3 to 1.2% chromium, 1.5 to 3.5% nickel, from trace up to 1.5% molybdenum plus tungsten, 0.3 to 1% manganese, less than 1% silicon, elements from a group comprising the following additions: from trace up to 0.5% vanadium, from trace up to 0.5% titanium, less than 0.075% and 0.050% of phosphorus and sulphur respectively, and the balance iron, said welding material being characterized by having contents of carbon, chromium, molybdenum and nickel lower than in the parts to be welded, stripping the mold between 1000° C. and 0° C., cooling, reheating at least once above transformation point, cooling, and reheating at least once under transformation point.

4. A method for welding steel parts containing 0.2 to 0.5% carbon, 0.6 to 2% chromium, 2 to 5% nickel, 0.1 to 1.5% molybdenum plus tungsten including 0.1 to 1% molybdenum, 0.2 to 1% manganese, 0.1 to 0.5% silicon, from trace up to 0.5% vanadium, less than 0.035 and 0.015% of phosphorus and sulphur respectively and the balance iron, consisting in placing the ends of the parts to be welded in a mold, pouring into said mold a welding material of a self-hardening steel with 0.2 to 0.4% carbon, 0.3 to 1.2% chromium, 1.5 to 3.5% nickel, from trace up to 1.5% molybdenum plus tungsten, 0.3 to 1% manganese, less than 1% of silicon, from trace up to 0.5% vanadium, less than 0.075% and 0.050% of phosphorus and sulphur respectively, and the balance iron, said welding material being characterized by having contents of carbon, chromium, molybdenum and nickel lower than in the parts to be welded and stripping the mold between 1000° C. and 0° C.

5. A method for welding steel parts containing 0.2 to 0.5% carbon, 0.6 to 2% chromium, 2 to 5% nickel, 0.1 to 1.5% molybdenum plus tungsten including 0.1 to 1% molybdenum, 0.2 to 1% manganese, 0.1 to 0.5% silicon, from trace up to 0.5% vanadium, less than 0.035 and 0.015% of phosphorus and sulphur respectively and the balance iron, consisting in placing the ends of the parts to be welded in a mold, pouring into said mold a welding material of a self-hardening steel with 0.2 to 0.4% carbon, 0.3 to 1.2% chromium, 1.5 to 3.5% nickel, from trace up to 1.5% molybdenum plus tungsten, 0.3 to 1% manganese, less than 1% of silicon, from trace up to 0.5% vanadium, less than 0.075% and 0.050% of phosphorus and sulphur respectively, and the balance iron, said welding material being characterized by having contents of carbon chromium, molybdenum and nickel lower than in the parts to be welded, stripping the mold between 1000° C. and 0° C., cooling and reheating at least once above transformation point.

6. A method for welding steel parts containing 0.2 to 0.5% carbon, 0.6 to 2% chromium, 2 to 5% nickel, 0.1 to 1.5% molybdenum plus tungsten including 0.1 to 1% molybdenum, 0.2 to 1% manganese, 0.1 to 0.5% silicon, from trace up to 0.5% vanadium, less than 0.035 and 0.015% of phosphorus and sulphur respectively and the balance iron, consisting in placing the ends of the parts to be welded in a mold, pouring into said mold a welding material of a self-hardening steel with 0.2 to 0.4% carbon, 0.3 to 1.2% chromium, 1.5 to 3.5% nickel, from trace up to 1.5% molybdenum plus tungsten, 0.3 to 1% manganese, less than 1% of silicon, from trace up to 0.5% vanadium, less than 0.075% and 0.050% of phosphor and sulphur respectively, and the balance iron, said welding material being characterized by having contents of carbon, chromium, molybdenum and nickel lower than in the parts to be welded, stripping the mold between 1000° C. and 0° C., cooling, reheating at least once above transformation point, cooling, and reheating at least once under transformation point.

7. A method for welding steel parts containing 0.2 to 0.5% carbon, 0.6 to 2% chromium, 2 to 5% nickel, 0.1 to 1.5% molybdenum plus tungsten including 0.1 to 1% molybdenum, 0.2 to 1% manganese, 0.1 to 0.5% silicon, from trace up to 0.5% titanium, less than 0.035 and 0.015% of phosphorus and sulphur respectively and the balance iron, consisting in placing the ends of the parts to be welded in a mold, pouring into said mold a welding material of a self-hardening steel with 0.2 to 0.4% carbon, 0.3 to 1.2% chromium, 1.5 to 3.5% nickel, from trace up to 1.5% molybdenum plus tungsten, 0.3 to 1% manganese, less than 1% of silicon, from trace up to 0.5% titanium, less than 0.075% and 0.050% of phosphorus and sulphur respectively, and the balance iron, said welding material being characterized by having contents of carbon, chromium, molybdenum and nickel lower than in the parts to be welded and stripping the mold between 1000° C. and 0° C.

8. A method for welding steel parts containing 0.2 to 0.5% carbon, 0.6 to 2% chromium, 2 to 5% nickel, 0.1 to 1.5% molybdenum plus tungsten including 0.1 to 1% molybdenum, 0.2 to 1% manganese, 0.1 to 0.5% silicon, from trace up to 0.5% titanium, less than 0.035 and 0.015% of phosphorus and sulphur respectively and the balance iron, consisting in placing the ends of the parts to be welded in a mold, pouring into said mold a welding material of a self-hardening steel with 0.2 to 0.4% carbon, 0.3 to 1.2% chromium, 1.5 to 3.5% nickel, from trace up to 1.5% molybdenum plus tungsten, 0.3 to 1% manganese, less than 1% of silicon, from trace up to 0.5% titanium, less than 0.075% and 0.050% of phosphorus and sulphur respectively and the balance iron, said welding material being characterized by having contents of carbon, chromium, molybdenum and nickel lower than in the parts to be welded, stripping the mold between 1000° C. and 0° C., cooling and reheating at least once above transformation point.

9. A method for welding steel parts containing 0.2 to 0.5% carbon, 0.6 to 2% chromium, 2 to 5% nickel, 0.1 to 1.5% molybdenum plus tungsten including 0.1 to 1% molybdenum, 0.2 to 1% manganese, 0.1 to 0.5% silicon, from trace up to 0.5% titanium, less than 0.035 and 0.015% of phosphorus and sulphur respectively and the balance iron, consisting in placing the ends of the parts to be welded in a mold, pouring into said mold a welding material of a self-hardening steel with 0.2 to 0.4% carbon, 0.3 to 1.2% chromium, 1.5 to 3.5% nickel, from trace up to 1.5% molybdenum plus tungsten, 0.3 to 1% manganese, less than 1% of silicon, from trace up to 0.5% titanium, less than 0.075% and 0.050% of phosphorus and sulphur respectively, and the balance iron, said welding material being characterized by having contents of carbon, chromium, molybdenum and nickel lower than in the parts to be welded, stripping the mold between 1000° C. and 0° C., cooling, reheating at least once above transformation point, cooling, and reheating at least once under transformation point.

CLARENCE LEON DELACHAUX.